Patented Oct. 29, 1940

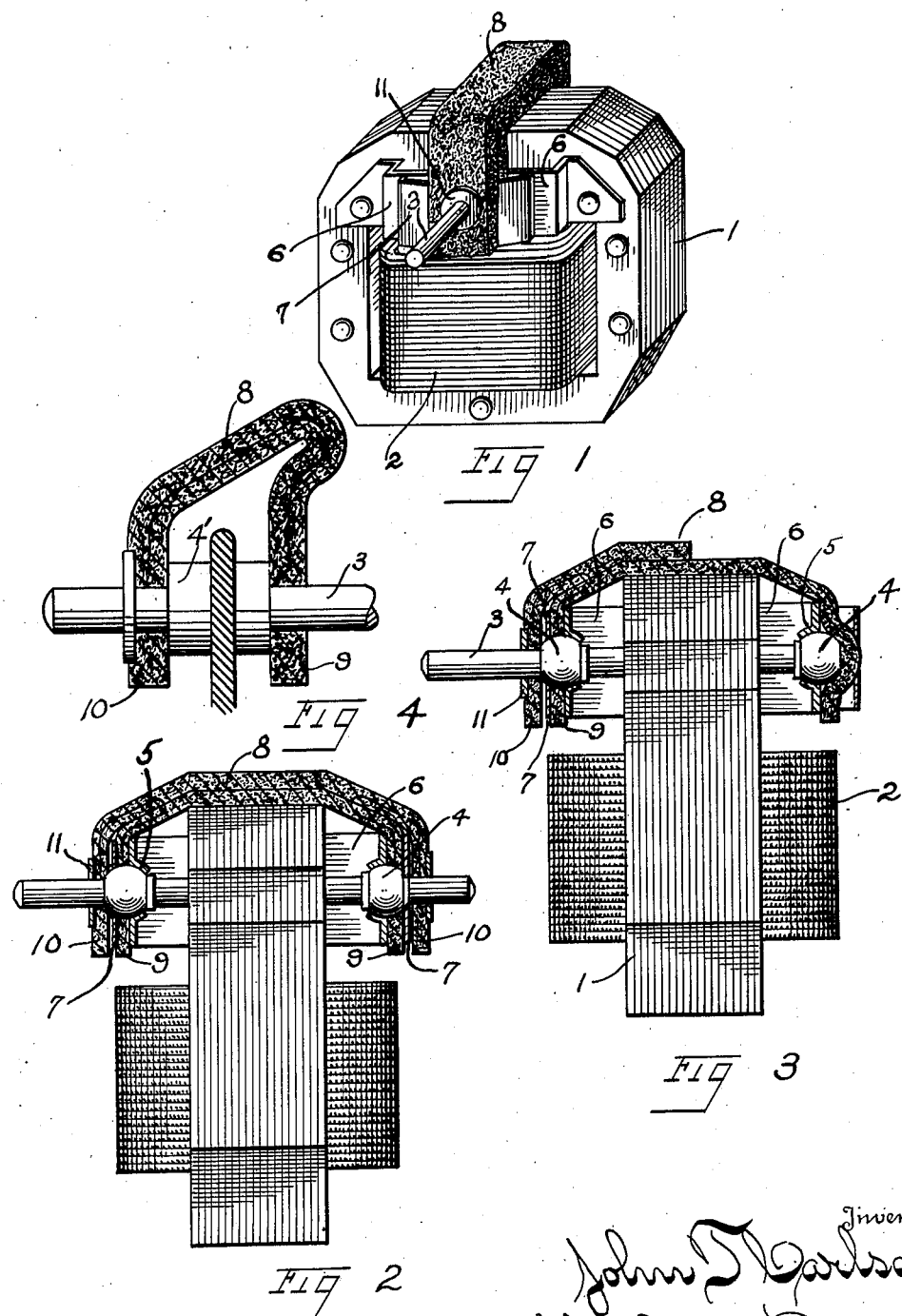

2,219,719

UNITED STATES PATENT OFFICE 2,219,719

LUBRICATING MEANS FOR MOTORS

John T. Carlson, Dayton, Ohio, assignor to The Master Electric Company, Dayton, Ohio, a corporation of Ohio Application August 28, 1935, Serial No. 38,241

15 Claims. (Cl. 308—125)

This invention relates to lubricant control means for bearings and more particularly to a syphonic system of lubricant circulation whereby the lubricant exuded from a bearing is automatically collected and returned thereto after being permitted to cool while in transit from one side of the bearing to the other.

For illustrative purposes but without intent to unduly limit the application or scope of the invention it has been shown in the drawing as applied to a small induction type motor such as is shown in U. S. Letters Patent No. 1,993,449, dated March 5, 1935, where is disclosed lubricant supply means of which the present invention is a further development and amplification.

In the patent referred to there is shown a band of oil absorbent material which spans the stator of the motor and extends contiguous to the rotor shaft bearings on opposite sides of the stator to which the lubricant is supplied. In the present instance, separated terminal portions of the absorbent material spans the shaft bearings and so long as the bearing is dry and in need of lubricant will supply lubricant to both sides of the bearing. Means is provided for centrifugally discharging superfluous lubricant exuded from the bearing which is received by the absorbent body and automatically returned therethrough to the opposite side of the bearing by capillary attraction. There is thus established a circuitous path for lubricant from one side of the bearing to the other.

The object of the invention is to simplify the structure as well as the means and mode of operation of lubricant distribution devices for electric motors and other small machines whereby such lubricant control means will not only be inexpensive but will be quite efficient in use, automatic in operation, uniform in action and unlikely to get out of order.

A further object of the invention is to minimize losses of lubricant by collecting the surplus oil as it exudes from the bearing and returning it thereto.

A further object of the invention is to prevent the wide distribution or scattering of surplus lubricant outside the bearing.

A further object of the invention is to provide a circulatory system for lubricant wherein the surplus lubricant exuded from the bearing will be cooled before being returned thereto.

A further object of the invention is to provide an automatic syphonic system employing capillary attraction for inducing lubricant circulation.

A further object of the invention is to provide a constant uniform supply of lubricant to a shaft bearing.

A further object of the invention is to provide a lubricant circulating system possessing the meritorious characteristics and advantageous features of construction herein mentioned.

With the above primary and other incidental objects in view, as will more fully appear in the specification, the invention consists of the features of construction, the parts and combinations thereof, and the mode of operation, or their equivalents, as hereinafter described and set forth in the claims.

Referring to the accompanying drawing wherein is shown the preferred, but obviously not necessarily the only form of embodiment of the invention, Fig. 1 is a perspective view of a conventional type of small motor, to which the present lubricant supply and circulatory system has been applied.

Fig. 2 is a transverse sectional view through the rotor shaft mounting of the motor showing the relation of the lubricant circulatory bands thereto.

Fig. 3 is a similar view wherein the capillary syphonic circulatory system is applied to one bearing only of the motor.

Fig. 4 is an enlarged detail view.

Like parts are indicated by similar characters of reference throughout the several views.

While the invention has been herein shown as applied to a small electric motor, it is to be understood that it is not limited to such application but may be applied to machines of any character and having bearings of various sizes although it no doubt will find its widest application in small motors, electric fans, and analogous mechanisms.

Referring to the drawing, 1 is the stator of the motor of which 2 is the winding or coil and 3 the rotor shaft. In the present instance the rotor shaft 3 is shown mounted in spherical self aligning bushings or bearings 4 seated in socket 5 in bearing brackets 6 secured to the opposite sides of the stator 1. The spherical bearings 4 are held within their sockets 5 by bow springs 7, the ends of which are engaged with the bracket 6 in the manner shown in the recently issued Patent No. 2,011,493 of August 13, 1935, extending across the motor stator 1 with its ends downturned contiguous to the bearings 4 at opposite sides of the stator is a band 8 of oil absorbent material such as felt. This band of absorbent material 8 may comprise two strips superposed one upon the other or a single strip bifurcated at its ends to afford inner and outer interconnected portions 9 and 10. The bearing members 4 illustrated in the drawing are of a porous character comprising a copper-tin-graphite bronze of highly absorbent character capable of holding within its pores quite a considerable volume of lubricating material which is gradually supplied to the shaft. Such bearing has been shown merely for illustrative purposes incidental to the motor structure illustrated and does not form any part of the present invention per se. In fact the present invention is in no way dependent upon this particular type of porous bearing. In Fig. 4 there has been illustrated an ordinary form of non-porous shaft bearing to which the invention is equally applicable.

As shown in the drawing one of the separated terminal portions 9 of the absorbent oil soaked body 8 extends contiguous to the bearing element 4 and supplies lubricant thereto for lubricating the shaft. Unless means is provided for arresting and collecting the surplus lubricant it is found that oil will be exuded from the bearing along the shaft and scattered promiscuously by centrifugal tendency. To prevent this the second separated terminal of the oil absorbent body 8 is extended outside the bearings and about the shaft 3 upon which is mounted in close proximity to the dependent terminal portion 10 of the absorbent body a disc 11 which may take the form of a peripheral enlargement on the shaft and which not only arrests the flow of oil along the shaft, but by its rotation serves to discharge the oil by centrifugal tendency into the contiguous portion of the absorbent strip terminal 10. The exuded oil discharged centrifugally from the disc 11, known as a "slinger" disc is absorbed by the terminal portion 10 of the absorbent body 8 and drawn upward therein by capillary attraction. As the oil accumulates in this portion of the absorbent body it rises above the bifurcation and passes thence into the inner terminal portion 9. The absorbent body is maintained in a substantially saturated condition. The discharged lubricant leaving the slinger disc 11 enters the absorbent body at a somewhat higher level than that at which the lubricant is supplied to the shaft bearings through the dependent terminal portion 9 and the coacting absorbent bearing member 4. Therefore the inner leg of the bifurcation being of slightly greater effective length than the outer oil receiving terminal portion feeds the oil by gravity to the bearings and induces a syphonic effect in which the surplus oil is raised by capillary attraction through the outer absorbent portion 10 and returned downwardly to the bearings through the inner dependent leg or terminal portion 9. There is thus provided a circuitous path for the lubricant which being exuded from the bearing and being discharged centrifugally from the disc 11 enters the outer leg 10 of the bifurcation of the absorbent body 8 and ascending through such outer leg 10 beyond the bifurcation returns through the inner dependent leg or terminal portion 9 to the bearing into which it is again discharged, the lubricant thereby completing the circuit. Any heat absorbed by the lubricant during its passage through the bearing is dissipated during the circulation of the lubricant through the absorbent body prior to its return to the bearing. The path of circulation of the lubricant is clearly indicated by a succession of arrows in the respective figures.

In lieu of employing a strip or body of absorbent material bifurcated at its extremity, a single strip of such material may be employed in spanning relation with a bearing 4' as shown in Fig. 4 wherein one end of the absorbent strip is disposed at each side of the bearing, the intermediate portion being formed into an upturned bight which spans the bearing. The circuitous flow of the lubricant from one side of the bearing where it is centrifugally discharged by the disc 11 through the strip of absorbent material and back to the opposite side of the bearing is indicated by the arrows. Oil may be supplied to the capillary means by soaking the bands in oil and then adding oil thereto, preferably a few drops at a time, as the oil therein is depleted. It is immaterial in what manner the oil is supplied to the band so far as circulation of the oil in the system is concerned.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claims.

Having thus described my invention, I claim:

1. Lubricating means for an electric motor wherein a rotor is mounted in relatively immovable spaced bearings at opposite sides of the motor stator including two superposed bands of oil absorbent material, said bands spanning the stator and one of said bands contacting each of said bearings at opposite ends of the band, the other band contacting the rotor shaft at each end of the band whereby said bands supply oil to the bearings and receive oil discharged from bearings for return thereto.

2. In a lubricating device for an electric motor wherein a rotor is mounted in relatively immovable spaced bearings at opposite sides of the motor stator, a quantity of oil absorbent material spanning the motor stator including divided terminal portions extended in straddle relation with the respective bearings another quantity of oil absorbent material including divided terminal portions extended in straddle relation with the rotor shaft adjacent the respective bearings, said bodies of absorbent material being in communication with each other whereby oil will be supplied to each bearing through one of the divided terminal portions and collected therefrom through the other divided terminal portion, and forming a circuitous path for excess lubricant.

3. Lubricating means for a bearing for a rotary shaft including a body of oil absorbent material spanning the shaft bearing and surrounding the shaft at opposite sides thereof, a slinger disc carried by the shaft and intercepting surplus lubricant flowing from the bearing by centrifugal tendency and into the path of which said absorbent material extends, said absorbent material being adapted to be saturated with oil which is supplied thereby to one side of the bearing and received thereby from the opposite side of the bearing through a centrifugal oil discharge action, and forms a circuitous path for surplus lubricant.

4. Lubricating means for an electric motor wherein the rotor shaft is mounted in relatively immovable spaced bearings at opposite sides of a motor stator characterized by peripheral enlargements carried by the rotor shaft at the outer sides of the bearings, for intercepting and centrifugally discharging surplus lubricant exuded from the bearings, a body of oil absorbent material spanning the motor stator and extending into proximate relation with the peripheral enlargements carried by the shaft for absorbing the lubricant discharged therefrom, and another body of oil absorbent material and extending in proximate relation with the relatively immovable bearings, and oil absorbent bodies being in superposed contacting relation.

5. Lubricating means for a shaft bearing including an oil absorbent material bridging the upper portion of the bearing and having engagement adjacent one of its ends with a movable lubricant carrying part and adjacent its other end with a relatively immovable part, the point of engagement with the movable lubricant carrying part being higher than the point of engagement with the relatively immovable part and the intermediate portion thereof being higher than either of its ends, to form a path through which lubricant exuded from one side of the bearing is returned to the opposite side thereof by a capillary syphonic transfer.

6. Lubricant circulating means wherein lubricant is repetitiously transferred by capillary syphonic action from a lubricant discharge terminal to a lubricant intake terminal of a shaft bearing, and thence through the bearing, characterized by an inverted U-shaped portion of lubricant absorbent material having dependent legs bridging a shaft bearing with one of its legs disposed in lubricant supplying relation with the lubricant intake terminal of the bearing and the other of its legs disposed in lubricant receiving relation with the lubricant discharge terminal of the bearing and through which lubricant flows by capillary syphonic action from one terminal to the other of the bearing and means for conveying lubricant to the leg disposed in lubricant receiving relation with the lubricant discharge terminal of the bearing at a point higher than the point of lubricant delivery of the leg in lubricant supplying relation with the lubricant intake terminal of the bearing to such intake terminal.

7. Lubricating means for a relatively immovable rotary shaft bearing, including a body of oil absorbent material extending from one side of the bearing to the other across the upper portion of the bearing and into proximate relation with one side thereof, and a slinger disc carried by the rotary shaft adjacent the opposite side of the bearing and intercepting lubricant exuded from that side of the bearing, the body of absorbent material extending into the path of movement of the disc, collecting lubricant centrifugally discharged from the disc, and conveying the discharged lubricant by syphonic capillarity to the side of the bearing with which it is in proximate relation.

8. Lubricating means for a relatively immovable rotary shaft bearing, including a slinger disc mounted upon the rotary shaft at one side of the bearing and adapted to intercept and centrifugally discharge lubricant exuded from that side of the bearing, and a body of oil absorbent material located in proximate relation with the opposite side of the bearing and extending thence into the path of the oil centrifugally discharged from the slinger disc for collecting and conveying the discharged oil to the side of the bearing with which it is in proximate relation.

9. In combination with a rotary shaft bearing, means for recovering oil exuded from the bearing and reapplying it thereto, including a peripheral enlargement carried by the rotary shaft adjacent one end of the bearing adapted to intercept and centrifugally discharge exuded oil, and a body of oil absorbent material extending into and beyond the range of centrifugal oil discharge of the enlargement and into proximate relation with the opposite side of the bearing, the oil absorbent material being arranged to convey the centrifugally discharged oil to such opposite side of the bearing by capillarity.

10. Lubricating means for a rotary shaft bearing, including an oil absorbent material spanning the bearing above the level thereof and extending contiguous to the opposite sides of the bearing to form with the bearing a circuitous path through which oil exuded from one side of the bearing is returned to the opposite side thereof, a relatively movable lubricant carrying part adjacent one side of the bearing with which one end of the oil absorbent material is associated and a relatively immovable part at the opposite side of the bearing with which the opposite end of the oil absorbent material is associated, the oil absorbent material receiving exuded oil from the relatively movable part and transferring it by capillarity to the relatively immovable part.

11. Lubricating means for a rotary shaft bearing, including a centrifugal discharge device for oil exuded from the bearing, and an oil absorbent collector extending into and beyond the discharge range of the centrifugal discharge device and contiguous to the bearing, the oil absorbent collector being arranged to return the centrifugally discharged oil to the bearing by capillarity.

12. The herein described method of lubricant control for bearings including centrifugally discharging oil exuded from one side of the bearing, collecting the centrifugally discharged exuded oil in an oil absorbent material actively elevating the oil to a higher level on one side of the bearing than on the other and returning the collected oil to the opposite side of the bearing by capillary syphonic transfer through the collecting means.

13. The herein method of circulating lubricant through a bearing, including centrifugally discharging lubricant exuded from the bearing, collecting the centrifugally discharged lubricant, conducting the collected lubricant upwardly to a higher level than the point of centrifugal discharge thereof and thence downwardly to the opposite side of the bearing by syphonic capillary action and returning the lubricant through the bearing to the point of centrifugal discharge in an endless circuitous cycle.

14. The herein described method of circulating lubricant relative to a bearing, including the steps of collecting the lubricant exuded from one side of the bearing, actively elevating the collected lubricant by syphonic capillary action to a higher level on one side of the bearing than the other, through an arched path of travel to the opposite side of the bearing and returning the lubricant through the bearing to the point of collection in an endless repetitious cycle.

15. The herein described method of circulating lubricant relative to a bearing, including the step of actively elevating lubricant exuded from one side of a bearing exteriorly thereof to a higher level on one side of the bearing than on the other and thence to the opposite side of the bearing by syphonic capillary attraction and returning the lubricant through the bearing to the exuding point for re-circulation by syphonic capillary action in an endless repetitious cycle.

JOHN T. CARLSON.